United States Patent [19]

Cucchi et al.

[11] Patent Number: 4,894,710
[45] Date of Patent: Jan. 16, 1990

[54] SYSTEM FOR PROCESSING COLOR TELEVISION SIGNALS WITH AMPLITUDE MODULATION ENCODED CHROMINANCE INFORMATION

[75] Inventors: Silvio Cucchi, Gaggiano; Marco Modena, Milan; Roberto Peruta, Ponte S. Pietro, all of Italy

[73] Assignee: Telettra Telefonia Elettronica e Radio S.p.A., Milan, Italy

[21] Appl. No.: 132,428

[22] Filed: Dec. 14, 1987

[30] Foreign Application Priority Data

Dec. 17, 1986 [IT] Italy ................................ 22717 A/86

[51] Int. Cl.$^4$ ............................................. H04N 11/04
[52] U.S. Cl. ...................................... 358/13; 358/138; 358/21 R
[58] Field of Search .................. 358/138, 21 R, 11, 13, 358/12, 133, 81, 82

[56] References Cited

U.S. PATENT DOCUMENTS

| | | | |
|---|---|---|---|
| 4,037,248 | 7/1977 | Iijima et al. | 358/13 |
| 4,106,053 | 8/1978 | Maxemchuk | 358/13 |
| 4,129,882 | 12/1978 | Limb | 358/13 |
| 4,302,775 | 11/1981 | Widergren et al. | 358/136 |
| 4,394,774 | 7/1983 | Widergren et al. | 382/56 |
| 4,472,732 | 9/1984 | Bennett et al. | 358/21 R X |
| 4,541,008 | 9/1985 | Fishman et al. | 358/138 X |
| 4,568,912 | 2/1986 | Kitamura | 358/138 X |
| 4,589,020 | 5/1986 | Akatsuka | 358/21 R X |
| 4,695,874 | 9/1987 | Sasson | 358/21 R |
| 4,745,473 | 5/1988 | Hall | 358/133 |

Primary Examiner—Tommy P. Chin
Assistant Examiner—Victor R. Kostak
Attorney, Agent, or Firm—Ostrolenk, Faber, Gerb & Soffen

[57] ABSTRACT

A system which permits a color television signal to be efficiently encoded by a unidimensional or bidimensional transform. The color television signal input to the system is sampled using a variable frequency sampling clock, and the sampled signal is digitally processed. The result is three signals having statistical characteristics similar to the individual component signals of the original color television signal. These resultant signals are encoded to obtain a highly compressed color television signal for transmission.

8 Claims, 3 Drawing Sheets

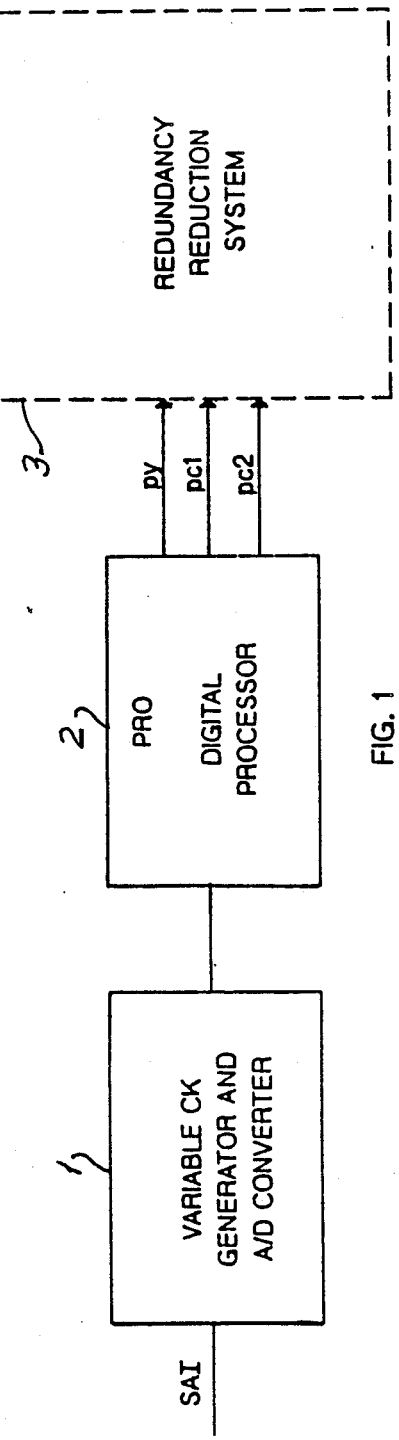
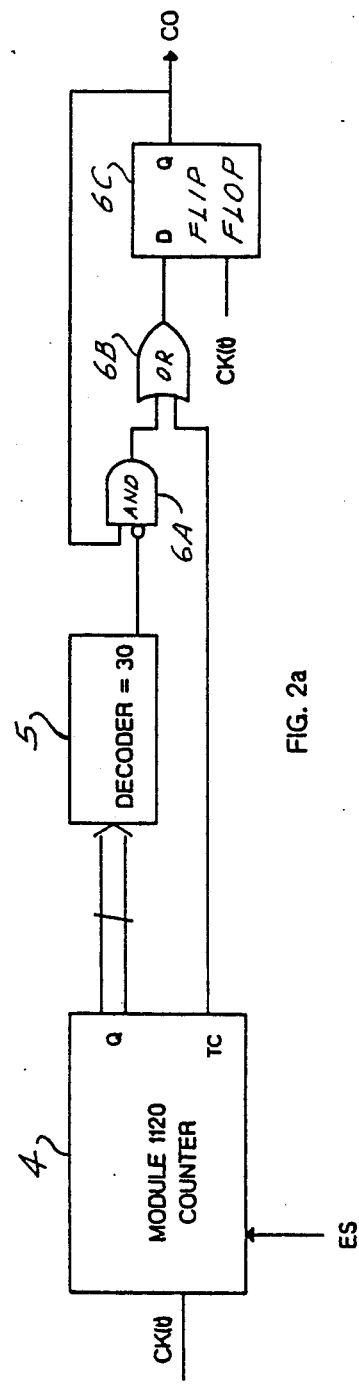
FIG. 1
FIG. 2a

SYSTEM FOR PROCESSING COLOR TELEVISION SIGNALS WITH AMPLITUDE MODULATION ENCODED CHROMINANCE INFORMATION

BACKGROUND OF THE INVENTION

1. Field of the Invention:

The present invention relates to a system for processing color TV signals with amplitude modulation encoded chrominance information.

2. Description of the Related Art:

Color TV signals (e.g. PAL (European format) or NTSC (U.S.A. format)) are generally unsuitable for encoding through unidimensional or bidimensional high efficiency transform.

Although it is *possible* to apply a unidimensional or bidimensional transform to a PAL or NTSC TV signal, two problems arise in doing so:

(1) Spreading of energy over a high number of coefficients occurs when transforming base band signals.

(2) Limitations on the dimensions of the transform or, alternatively, lack of connection between the image geometry and the block on which the transform operates.

A color TV signal is a composite signal which can be expressed by the following formula:

$$s(t) = y(t) + c1(t) \times \text{COS}(2PI \times Fscxt) + c2(t) \times \text{SIN}(2PI \times Fscxt) \quad (1)$$

where:

$y(t)$ is the luminence signal;
$C1(t)$, $c2(t)$ are the chrominance signals;
$PI$ is a constant;
$Fh$ is the line frequency; and
$Fsc$ is the chrominance subcarrier frequency which equals $(1135/4 + 1/625) \times Fh$ for PAL and $455/2 \times Fh$ for NTSC)

In the presence of uniform images signals, y, c1, c2 are constant; however, the composite signal $s(t)$ is not constant because modulation introduces an alternating current component.

Consequently, when an encoding transform is applied to the composite signal, a large number of non-zero coefficients will arise even if the image remains still, and the compression efficiency is significantly decreased as compared to the case in which the transformed signals are base band signals $y(t)$, $c1(t)$, $c2(t)$.

The problem may be solved by inserting a demodulator between the signal source and the encoder. By doing so, compression efficiency improves, but the signal quality considerably degrades, and costs increase considerably because the demodulation circuitry is quite expensive.

SUMMARY OF THE INVENTION

The present invention avoids the above-noted deficiencies of the prior art by providing a system which receives at its input a color TV composite signal as described above, and produces at its output three unique signals: (a) pseudo luminescence Py; (b) pseudo chrominescence Pc1; and (c) pseudo chrominescence Pc2. These three signals have statistical characteristics which are similar to the original color TV signal components $y(t)$, $c1(t)$, $c2(t)$, but otherwise the signals are significantly different. Most importantly, the three pseudo signals produced by the present invention can be directly encoded with a unidimensional or bidimensional transform without the need for demodulation.

BRIEF DESCRIPTION OF THE DRAWINGS

These and other features of the invention will become apparent when the following text is read in conjunction with the accompanying drawings in which:

FIG. 1 is a system block diagram of the invention;

FIG. 4 is a circuit schematic of the PAL signal processor of the present invention.

DETAILED DESCRIPTION OF THE PREFERRED EMBODIMENTS

Figure 2B:
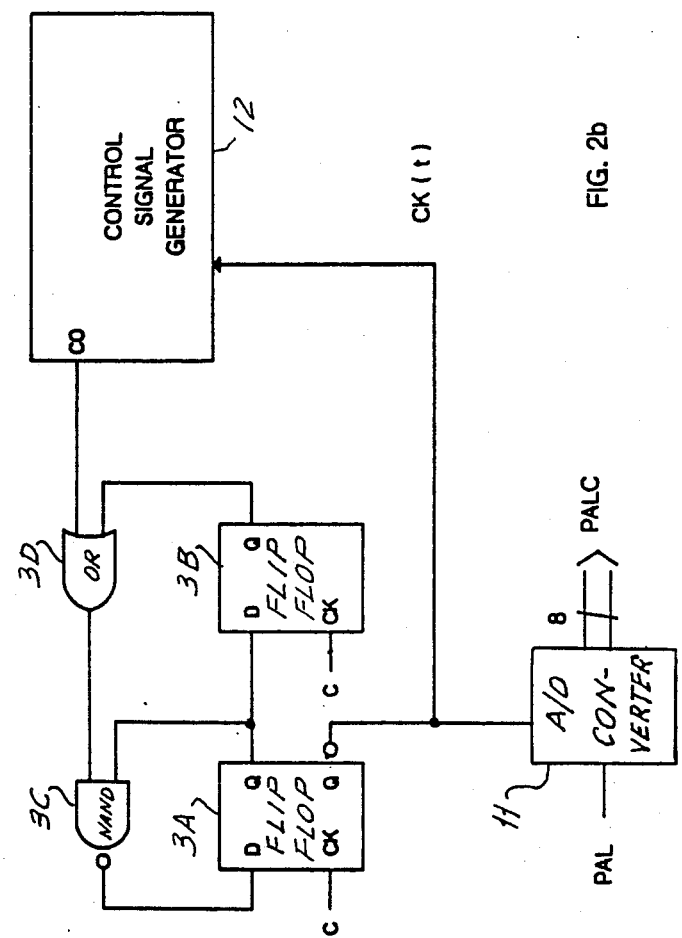
FIG. 2 is a circuit schematic of the control signal generator.

FIG. 1 shows a block diagram of the processing system of the present invention in which an analog input signal (SAI) is applied to block 1, which according to the invention consists of a variable clock generator and an analog to digital converter, the output of which is fed to block 2, a digital processor PRO, which in turn supplies three processed signals py, pc1, pc2 to block 3, a "Redundancy Reducing System". Hence, the processing system of the invention consists of two parts:

the first part (1) where analog to digital conversion is performed by adopting a critically variable sampling frequency.

the second part (2) where, through appropriate processing, the sampled input signal is transformed into three signals py, pc1, pc2 having similar statistical characteristics as the original signals components y, c1, c2.

Hereafter, it will become apparent from the following text that this part of the processing system of the invention can be fully inverted without introducing errors; hence the signal quality does not degrade.

First Part

According to the invention, the sampling clock $ck(t)$ for sampling the analog input signal SAI must satisfy the following two conditions:

(a) its frequency must be equal (or very close) to $N \times Fsc$ (see equation (1)), where N is an integer.

(b) it must generate a number of samples per line which is multiple of the adopted transform.

A general solution satisfying above conditions (a) and (b) consists in adopting two different sampling frequencies, one for the active part of the video signal and one for the line synchronism part, complying with Nyquist's criterion on the single portions of the composite signal.

For the sake of clarity, a PAL (European video) signal will be considered as an example (see FIGS. 2a and 2b).

In analog to digital converter 11, the PAL signal is sampled with variable frequency clock $ck(t)$ (obtained from the circuit of FIG. 2) as a function of the signal spectrum content: in the active area, where the spectrum contains more energy sampling signal $ck(t)$ reaches the maximum frequency ckmax. In the case of line blanking, $ck(t)$ has a minimum frequency ckmin. Thus, Nyquist's criterion is satisfied in either case.

Therefore, it is possible to obtain a number of samples per line (in this case, e.g. 1120) which is a multiple of the dimension of the transform, which for this example has been given a dimension 8. Clock master C (see FIG. 2b) has, e.g., frequency $2270 \times Fh$. Variable frequency sampling clock ck(t) is generated by the circuit shown in FIG. 2b, which contains a control signal generator 12 (see FIG. 2a) and a sequential network consisting of flip-flops 3A and 3B, NAND gate 3C and OR gate 3D, which together generate a variable frequency clock signal ck(t), dividing the input frequency C by two or by three.

For every TV line, this circuit generates 1090 clock strokes at maximum frequency ckmax (equalling 2270×Fh/2) and 30 clock strokes at minimum frequency ckmin (equalling 2270×Fh/3)=1120 totally.

Control circuit 12 of FIG. 2b is shown in detail in FIG. 2a. It consists of counter 4, decoder 5, flip-flop 6C and gates 6A and 6B.

Circuit 12 is slave of external signal ES which is in phase with the TV synch.

To make counter 4 in phase with signal ES, the following strategy is opeerated. Conventionally, at a certain position of the video line, a rising edge is generated by the circuit extracting the horizontal frequency. Since this rising edge is subject to jitter, it is conventional to look for the rising edge in a specified time slot.

Once counter 4 has been phase locked to signal ES, control signal CO is produced at the output of 6C. As already stated, in this embodiment of the invention, this is performed by the circuit shown in FIG. 2a, which consists of counter modulus 1120 (block 4), decoder 5 generating a pulse the duration of which equals one clock stroke when counter 4 reaches "30", two gates 6A and 6B and flip-flop 6C.

In the exemplified case, sampling frequency ck(t) chosen for the active portion of the composite signal is rather close to 4×Fsc, so the samples obtained are type:

$$s(KT) = y(KT) + u(KT) \times \cos(2PI \times Fsc \times KT) + v(KT) \times \sin(2PI \times Fsc \times KT)$$

with T=1/(1135×Fh) (the usual notation of encoded signals FA1 viz. c1–u, c2–v has been adopted).

By inserting the value of Fsc, equation (3) is achieved:

$$s(KT) = y(KT) + u(KT) \times \cos[K \times PI/2 + K \times 2PI/(1135+625)] + v(KT) \times \sin[K \times PI/2 + K \times 2PI/(1135+625)]$$

Second Part

The arithmetic operations which permit one to obtain, (still in the case where system input signal SAI of FIG. 1 is PAL), the signals py, pc1, pc2 are now described.

Processor PRO of FIG. 3 processes four consecutive samples s1, s2, s3, s4 as follows:

| py1 = s1 + s3 | pc1 = s1 − s3 | (4) |
| py2 = s2 + s4 | pc2 = s2 − s4 | |

Unless there is an error (to be considered negligible) due to phase K×2PI/(1135+625), the py signals are proportional to the mean value of signal (y(t)), and the pc signals define the amplitude and phase of the altering current component.

This processing procedure is repeated on the quartets that follow.

Since py is proportional to the mean signal y(t), it has the same spectrum characteristics of luminance as the component signal, less an aliasing chrominance error. Signals pc1, pc2 have spectrum characteristics which are linearly dependent on the chrominance components of the component signal (u,v in case of PAL) vs sampling with respect to the color subcarrier.

As already stated, this operation can be completely reversed. The initial signals are again obtained at the receive end with the following formula:

| s1 = (py1 + pc1)/2 | s3 = (py1 − pc1)/2 | (5) |
| s2 = (py2 + pc2)/2 | s4 = (py2 − pc2)/2 | |

Figure 3:
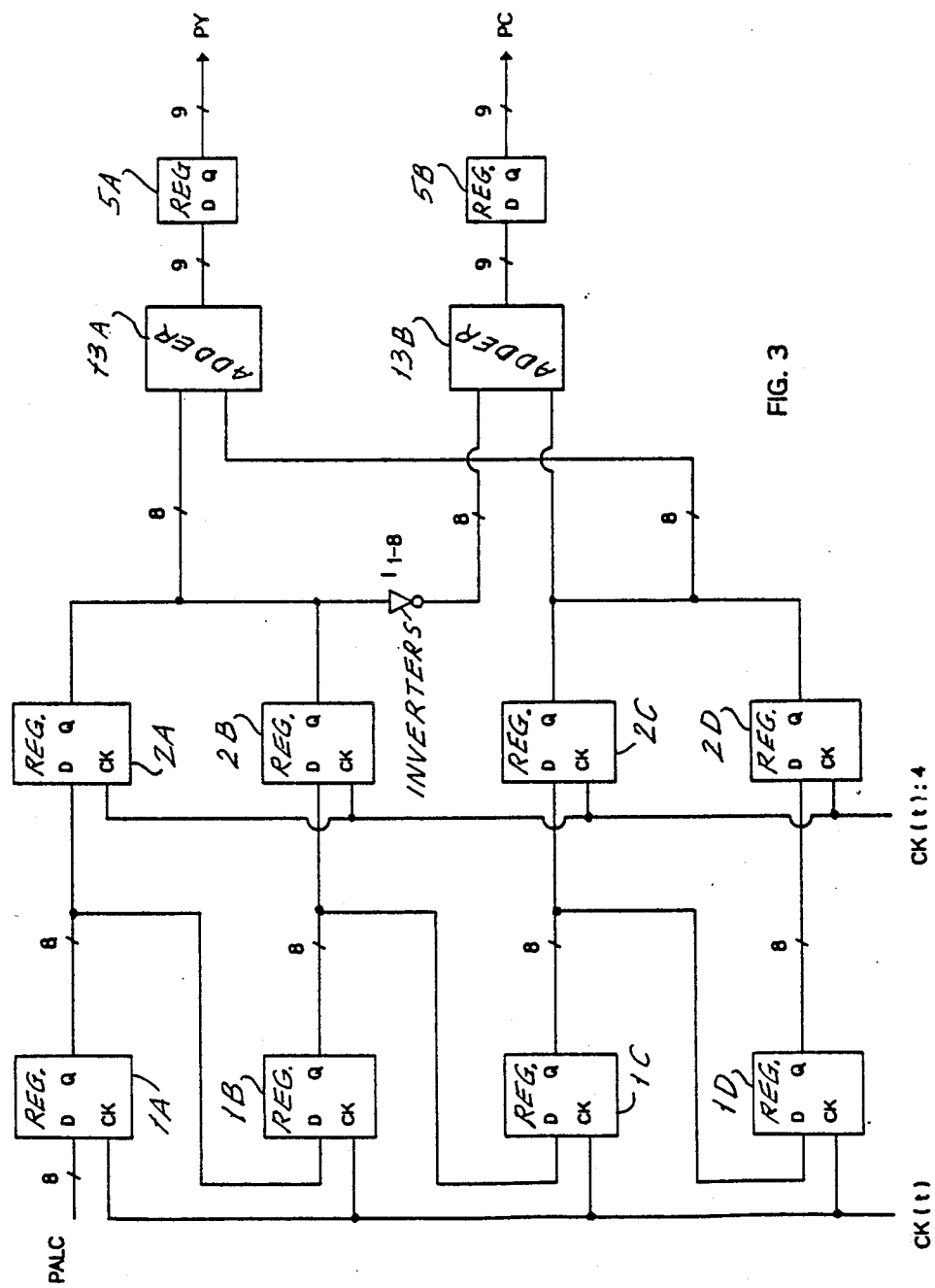
FIG. 3 is a circuit schematic of the variable frequency clock generator and the A/D converter of the present invention.

The PRO circuit, shown in the block diagram of FIG. 3 consists of four cascaded 8-bit registers 1A, 1B, 1C and 1D, four other 8-bit registers 2A, 2B, 2C and 2D, each of which is connected in parallel to one of registers 1, eight inverters I1 to I8, two 8-bit adders 13A and 13B and two 9-bit registers 5A and 5B at the output.

The NTSC signal processing procedure is similar to the one for the PAL signal. The difference lies in clock master frequency C, which is 1820×Fh.Mhz and in the number of clock strokes at one half and one third frequency, viz. 868 and 28, respectively.

In view of the fact that bidimensional transforms are to be performed, it is necessary to compensate for phase rotations that take place from one line to the other. In case of PAL, the chrominance carrier rotates by 90° and component V changes sign.

The first phenomenon (phase rotation) mutually exchanges the significance of output signals pc1 and pc2. This can be remedied by changing the sequence in which they are sent to the transformer.

The second phenomenon (change of sign) generates a vertical axis modulation, the effects of which can be attenuated simply by multiplying signals pc1 and pc2 by −1 on some of the lines but not others, i.e. pc1 and pc2 are unaltered on lines 1, 2, inverted on lines 3, 4 and become again unaltered on lines 5, 6 etc.

As far as the NTSC standard is concerned, the phase rotation from one line to the other is 180° and is compensated by multiplying signals pc1 and pc2 by −1 on alternating lines.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A system for processing color television signals having amplitude modulation encoded chrominance information comprising chrominance signals c1 and c2 and a baseband component comprising a luminance signal y, said system permitting the encoding of said color television signals through a unidimensional or bidimensional transform with high efficiency, said system comprising:
   (a) means for performing analog to digital conversion of said composite color television signal in conjunction with a variable frequency sampling clock ck(t); and
   (b) means for periodically transforming the signal output from said analog to digital conversion means into signals py, pc1 and pc2 comprising a pseudo luminance signal and two pseudo chrominance signals, respectively, which are correlated to, but are otherwise different than, said component signals y, c1, c2.

2. A system according to claim 1, wherein the variable sampling frequency is chosen so as to obtain a number of samples, per television line, which comprises a multiple of the dimension of the preestablished transform.

3. A system according to claim 1, wherein said color television signal to be processed consists of a base band component and a pass band component, said pass band being obtained from amplitude modulation encoding of one or more of said base band signals, wherein three base band signals are obtained by sampling at a frequency equalling N times the carrier frequency, followed by adding and subtraction on the samples.

4. A system according to claim 1, wherein said means for performing analog to digital conversion comprises at least one variable clock generator ck(t) and an analog to digital converter, said means for periodically transforming comprises a digital processor consisting of: (i) four cascaded registers, (ii) four further registers, each connected in parallel to one of said four cascaded registers, (iii) eight inverters connected to two of said further registers, (iv) two adders, one of said two adders connected directly to all four of said further registers, the other of said adders connected to directly to two of said further adders and to said eight inverters connected to the other two of said further registers, and (v) two output registers each connected to one of said two adders.

5. A system according to claim 1, wherein the variable sampling frequency is always greater than twice the bandwidth of the color television signal.

6. A system according to claim 5, wherein the variable sampling frequency is chosen so as to obtain a number of samples, per television line, which comprises a multiple of the dimension of the preestablished transform.

7. A system according to claim 5, wherein the variable sampling frequency of said variable frequency clock has only two preestablished values.

8. A system according to claim 7, wherein the variable sampling frequency is chosen so as to obtain a number of samples, per television line, which comprises a multiple of the dimension of the preestablished transform.

* * * * *